June 23, 1942.  A. R. THOMAS  2,287,281
REFRIGERATION
Filed July 30, 1940  3 Sheets-Sheet 1

INVENTOR.
Albert R. Thomas
BY
his ATTORNEY

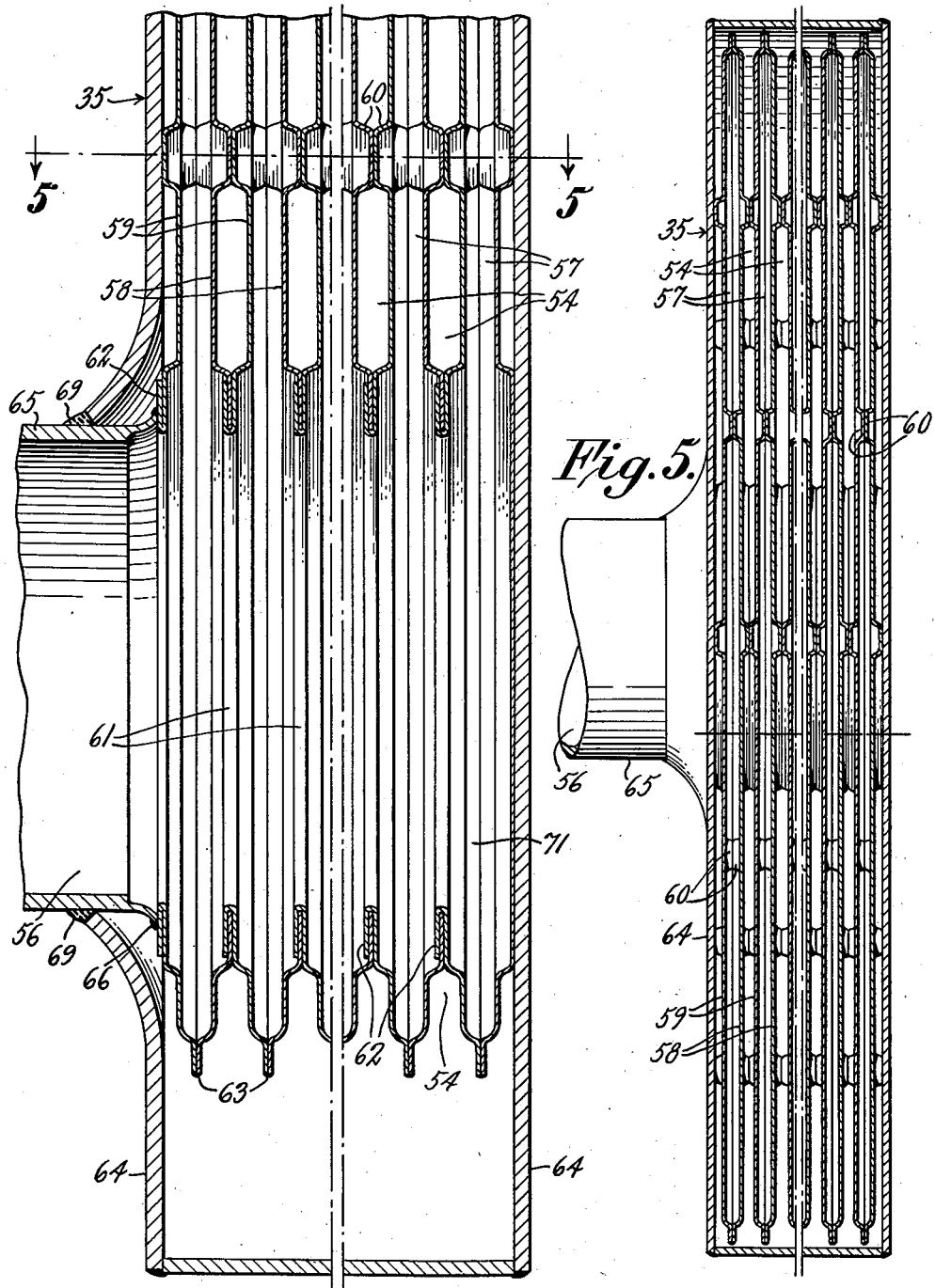

Patented June 23, 1942

2,287,281

UNITED STATES PATENT OFFICE 2,287,281

REFRIGERATION

Albert R. Thomas, Evansville, Ind., assignor to Servel, Inc., New York, N. Y., a corporation of Delaware Application July 30, 1940, Serial No. 348,490

11 Claims. (Cl. 62—119)

This invention relates to refrigeration, and more particularly to refrigeration systems of the absorption type operated by heat.

In a low pressure system of this type containing only a refrigerant and an absorption liquid therefor as the two active fluid components, a generator and condenser operate at one pressure and an evaporator and absorber operate at a lower pressure, and the pressure differential therebetween may be maintained by liquid columns. The system may contain a water solution of lithium chloride, for example, with water as the refrigerant and lithium chloride solution as the absorption liquid. In order to circulate absorption liquid through and between the generator and the absorber without a pump or other mechanical device, absorption liquid is raised by vapor-lift action in the generator and the raised liquid flows to the absorber and returns from the absorber to the generator by gravity.

In a low pressure absorption refrigeration system of the character just described, and particularly when a water solution of lithium chloride or other similar salt solution is employed, the viscosity of the liquid circulating in the absorption liquid circuit is relatively high and in a range from ten to twenty times greater than that of water. When only the force of gravity is available to effect circulation of absorption liquid which is relatively viscous compared to that of water, the rate of flow of the solution is slow and the flow is viscous in the absorption liquid circuit. Under these conditions the liquid heat exchanger in the absorption liquid circuit requires special consideration. The liquid heat exchanger, as is well known, is provided to conserve heat with heat being transferred from absorption liquid flowing to the generator. Under conditions usually encountered in practice, the rate of flow of the absorption liquid is such that the flow is turbulent contrasted to the viscous flow described above, and in such cases good heat transfer coefficients are usually promoted by virtue of such turbulent flow. In the present instance where the rate of flow of absorption liquid is relatively slow and viscous, heat must be conducted through practically stagnant liquid.

It is an object of this invention to provide an improvement in absorption refrigeration systems of the type described above, whereby the manner in which heat transfer is effected in the absorption liquid circuit is improved. This is accomplished by providing a liquid heat exchanger in which two streams of liquid are caused to flow out of physical contact and in heat exchange relation with each other in such a manner that good heat transfer is effected even though the heat must pass through practically stagnant liquid resulting from the relatively slow and viscous flow of the two liquid streams. Moreover, the liquid heat exchanger is formed in such a manner that resistance to flow of the liquid streams is relatively small. Even though the force of gravity is only available to cause the absorption liquid to pass through the liquid heat exchanger, the liquid heat exchanger is extremely efficient in that absorption liquid flows therethrough with minimum loss in head of liquid. The liquid heat exchanger is provided with a plurality of passages which in cross section are relatively long in one dimension and extremely narrow in the other dimension, the width or narrow dimension of the passages being in the neighborhood of one-eighth inch. With the heat transfer plates being approximately one-eighth inch apart, the maximum heat transfer path is only one-half this distance or one-sixteenth inch through substantially still liquid.

In a system in which a water solution of a salt is employed, such as, for example, a water solution of lithium chloride, there is the likelihood that passages in a liquid heat exchanger will be bridged with salt when the system is shut down. Such bridging of the passages results from salt crystals precipitating out of solution. When the liquid heat exchanger passages are completely blocked off with salt crystals, the refrigeration system generally cannot be started. By providing a liquid heat exchanger in which the passages in cross section are relatively long in one dimension, there is less likelihood of the passages being completely blocked off with salt crystals when the refrigeration system is shut down. With only partial blocking of the liquid heat exchanger passages by salt crystals, circulation of absorption liquid is always effected when the system is again started following a shutdown period, with the circulating absorption liquid tending to dissolve any crystals which may have formed.

The invention, together with the above and other objects and advantages thereof, will be better understood from the following description taken in connection with the accompanying drawings forming a part of this specification, and of which:

Fig. 4 is an enlarged fragmentary vertical sectional view taken on line 4—4 of Fig. 2;

Fig. 5 is an enlarged fragmentary horizontal sectional view taken on lines 5—5 of Figs. 2 and 4.

Figures 1, 6:
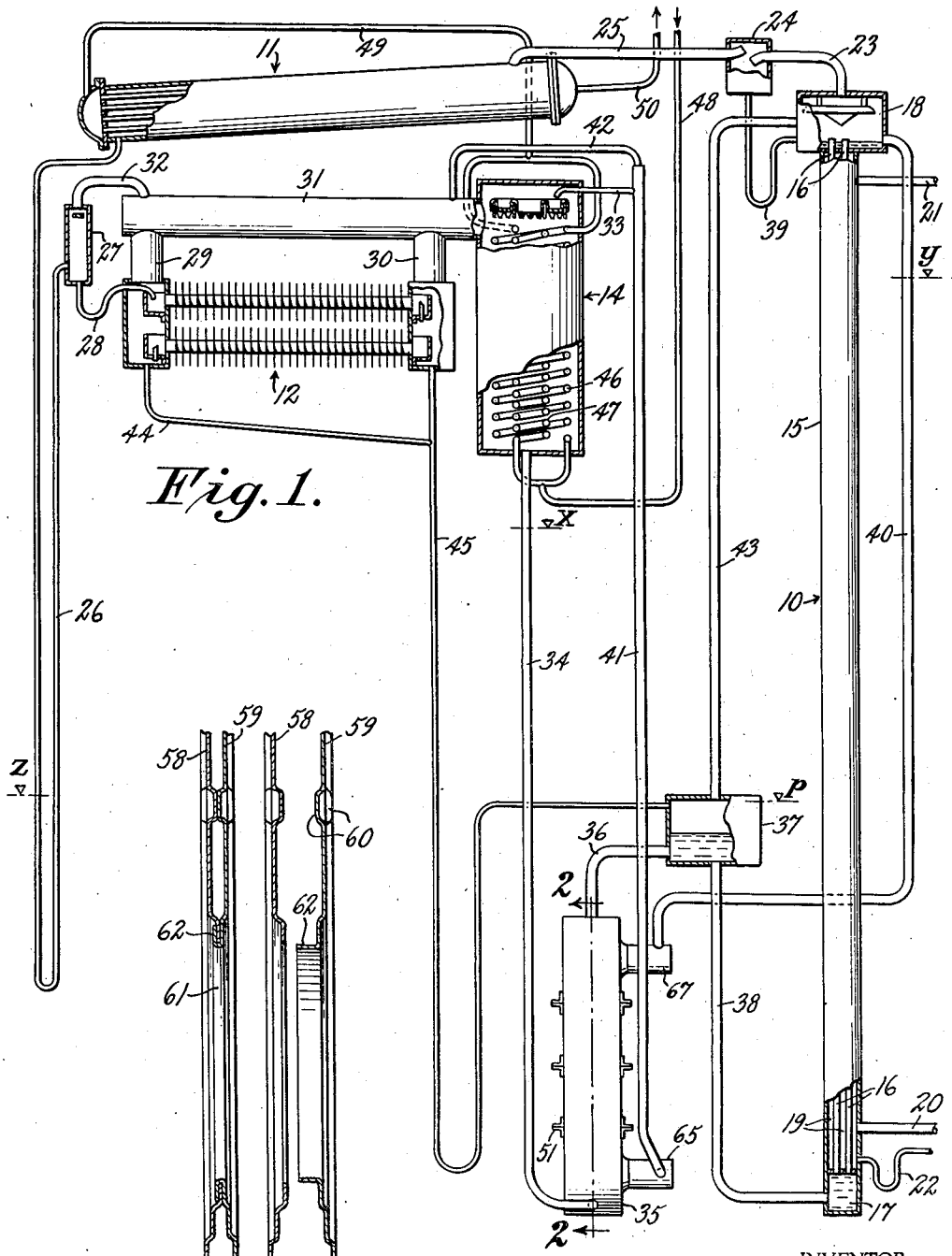
Fig. 1 is a view more or less diagrammatically illustrating a refrigeration system embodying the invention.
Fig. 6 is an enlarged fragmentary sectional view illustrating the manner in which heat transfer plates of the liquid heat exchanger are secured together at the end openings or apertures.

Referring to Fig. 1, the present invention is embodied in a two-pressure absorption refrigeration system like that described in application Serial No. 239,762 of A. R. Thomas and P. P. Anderson, Jr., filed November 10, 1938. A system of this type operates at low pressures and includes a generator or expeller 10, a condenser 11, an evaporator 12 and an absorber 14 which are inter-connected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. Briefly, the generator 10 includes an outer shell 15 within which are disposed a plurality of vertical riser tubes 16 having the lower ends thereof communicating with a space 17 and the upper ends thereof extending into a vessel 18. The space 19 within shell 15 and about the tubes 16 forms a steam chamber to which steam is supplied through a conduit 20. The space 19 provides for full length heating of riser tubes 16, and a vent 21 is provided at the upper end of shell 15. A trap conduit 22 is connected to the lower end of shell 15 above space 17 to provide a drain for condensate formed in space 19.

The system operates at a partial vacuum and contains a water solution of refrigerant in absorption liquid, such as, for example, a water solution of 40% lithium chloride by weight. The steam being supplied through conduit 20 to space 19 at atmospheric pressure, heat is applied to tubes 16 whereby water vapor is expelled from solution. The absorption solution is raised by vapor-lift action with the expelled water vapor forming a central core about an upwardly rising annulus of liquid. The expelled water vapor rises more rapidly than the liquid and the latter follows the inside walls of tubes 16.

The water vapor flows upward through the tubes 16, vessel 18, conduit 23, vapor separating chamber 24, and conduit 25 into condenser 11 in which it is liquefied. The condensate formed in condenser 11 flows therefrom through a U-tube 26, flash chamber 27, and conduit 28 into evaporator 12.

The water supplied to evaporator 12 evaporates therein to produce a refrigerating or cooling effect with consequent absorption of heat from the surroundings, as from a stream of air flowing over the exterior surface of the evaporator. The vapor formed in evaporator 12 passes through tubes 29 and 30 into a manifold 31 which is connected to absorber 14. To prevent disturbances in evaporator 12 the flash chamber 27 is provided to take care of any vapor flashing of liquid being fed to the evaporator through U-tube 26. The flashed vapor which may form passes through conduit 32 to manifold 31 and mixes with the vapor formed in evaporator 12.

In absorber 14 refrigerant vapor is absorbed in concentrated absorption liquid which enters through a conduit 33. The water vapor absorbed into the liquid dilutes the latter, and the diluted absorption liquid flows through a conduit 34, a first passage in liquid heat exchanger 35, a conduit 36, vessel 37, and conduit 38 into the lower space 17 of generator 10. Water vapor is expelled out of absorption liquid in generator 10 by heating and the liquid is raised by vapor-lift action in riser tubes 16, as explained above. Any liquid separated from vapor in separating chamber 24 flows through a U-trap 39 back to vessel 18.

The absorption liquid in vessel 18 is concentrated since water vapor has been expelled therefrom in generator 10. This concentrated liquid flows through a conduit 40, a second passage in liquid heat exchanger 35 and conduits 41 and 33, respectively, into absorber 14.

The upper end of conduit 41 is connected to manifold 31 by a conduit 42 which serves as a vent conduit. The upper end of vessel 37 is connected by a conduit 43 to vessel 18, whereby the pressure in vessel 37 is equalized with the pressure in the upper end of generator 10 and condenser 11. The lower parts of evaporator 12 are connected by conduits 44 and 45 to an upper part of vessel 37, so that excess liquid may be drained from evaporator 12 into vessel 37.

The heat liberated with absorption of water vapor in absorber 14 is transferred to a cooling medium, such as water, for example, which flows upward through coils 46 and 47 from a supply conduit 48. The coils 46 and 47 are connected by a conduit 49 to condenser 11, so that the same cooling medium may be utilized to cool absorber 14 and condenser 11. The cooling medium may flow from condenser 11 through a conduit 50 to waste.

The system operates at a low pressure with the generator 10 and condenser 11 operating at one pressure and the evaporator 12 and absorber 14 operating at a lower pressure, the pressure differential therebetween being maintained by liquid columns. Thus, the liquid column formed in tube 26 maintains the pressure differential between condenser 11 and evaporator 12, the liquid column in conduit 34 maintains the pressure differential between the outlet of absorber 14 and generator 10, and the liquid column formed in conduit 41 and parts connected thereto maintains the pressure differential between the inlet of absorber 14 and the upper part of generator 10. The liquid column formed in conduit 45 maintains the pressure differential between evaporator 12 and the upper part of vessel 37 which is pressure equalized with the upper part of generator 10 by pressure equalizing conduit 43. In operation, the liquid columns may form in conduits 34 and 40 and down-leg of tube 26 to the levels $x$, $y$ and $z$, for example. The conduits are of such size that restriction to gas flow is effected without appreciably restricting flow of liquid.

The liquid column formed in vessel 37 and conduit 38 provides the liquid reaction head for raising liquid in riser tubes 16 by vapor-lift action. The vessel 37 is of sufficient size to hold the liquid differential in the system and is of such cross-sectional area that the liquid level therein does not appreciably vary, so that a substantially constant reaction head is provided for lifting liquid in generator 10. The vessel 37 is located below absorber 14 such a distance that, for the greatest pressure differential occurring between absorber 14 and the upper part of generator 10 during operation of the system, the liquid column formed in conduit 34 is below the lower part of absorber 14.

The conduit 40 extends above conduit 33 in order that flow of absorption liquid will take place by gravity to absorber 14 and independently of the pressure differential in the system. After the pressure differential in the system has built up and the liquid column in conduit 40 is at the level $y$, for example, and of less height than the liquid column in conduits 41 and 33 due to the higher pressure in generator 10 than in absorber 14, gravity flow of absorption liquid still takes place from the upper part of conduit 40 to the inlet of absorber 14.

Figures 2, 3:
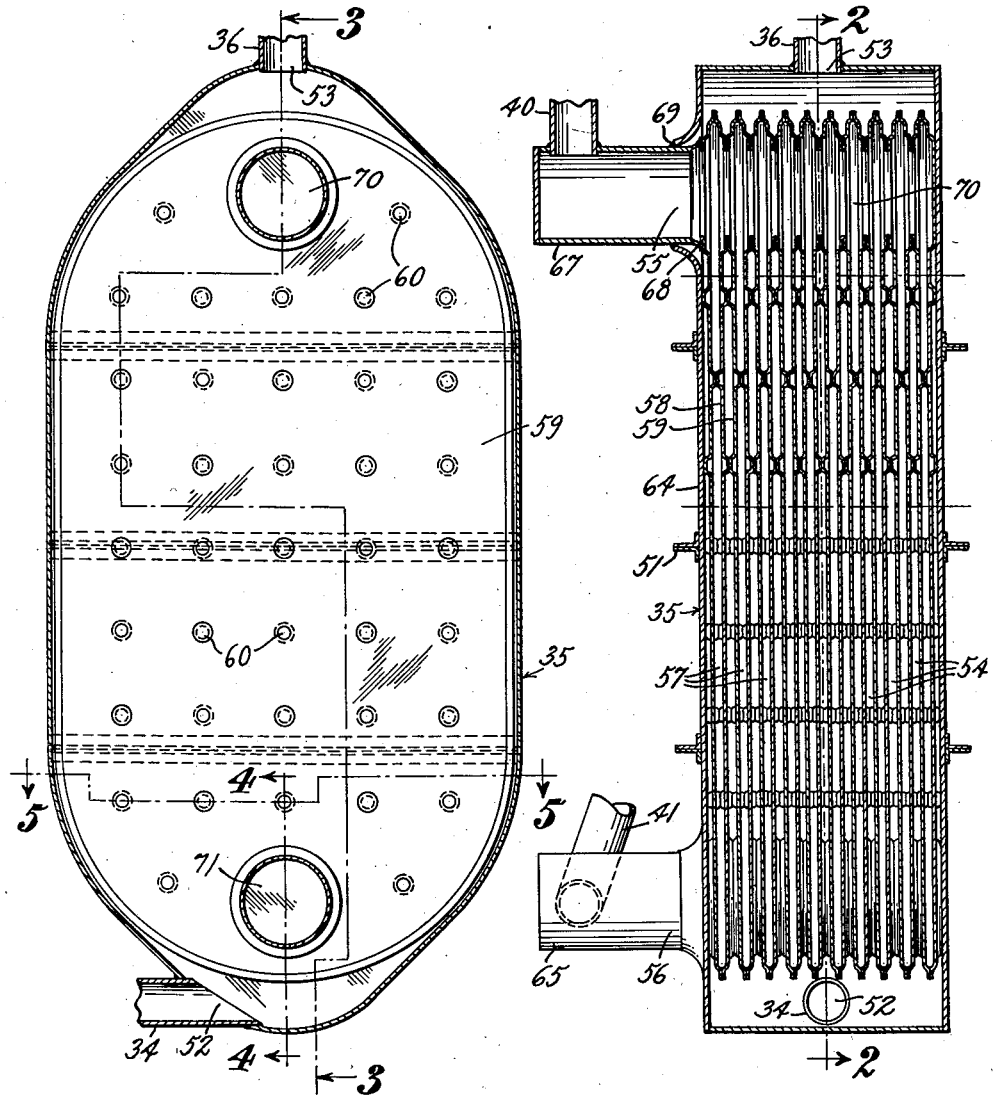
Fig. 2 is an enlarged vertical sectional view taken on lines 2—2 of Figs. 1 and 3, to illustrate more clearly the liquid heat exchanger in the refrigeration system.
Fig. 3 is a vertical sectional view taken on line 3—3 of Fig. 2.

In accordance with this invention the liquid heat exchanger 35 comprises a shell having angle members 51 secured thereto which serve as stiffeners or reenforcing ribs. Referring more particularly to Figs. 2 and 3, the shell is provided with inlet and outlet openings 52 and 53 for absorption liquid flowing through one group of passages 54, and inlet and outlet openings 55 and 56 for absorption liquid flowing through another group of passages 57 in the shell. The passages 54 and 57 are formed by a plurality of heat transfer plates 58 and 59 disposed within the shell. The heat transfer plates 58 and 59 are of the general shape shown in Fig. 2 and have parallel vertical sides and curved or rounded ends spaced from the extreme top and bottom of the shell.

The plates 58 and 59 are formed with indentations or buttons 60 projecting outward from each side of the plates. When the plates 58 and 59 are alternately assembled, the buttons 60 of adjacent plates are directly opposite and butt against each other to form the passages 54 and 57.

The heat transfer plates 58 and 59 are formed with openings 61 adjacent to the curved or rounded ends. The plates 58 are formed with simple openings, and the plates 59 are formed with openings having flanges 62. In fabricating the liquid heat exchanger, a number of plates 58 and 59 are secured together by passing the flanges 62 through the openings in plates 58 and then bending and flattening the flanges, as shown in Fig. 6.

The peripheral edge portions of heat transfer plates 58 and 59 are secured together by welding, as indicated at 63 in Fig. 4. It will be seen that the peripheral edge portions of the heat transfer plates 58 and 59 are offset laterally with respect to the main body portions of the plates and are in the same vertical planes as some of the buttons 60. Likewise, the regions or portions of the plates 58 and 59 in which the openings 61 are formed are offset laterally with respect to the main body portions of the plates and in the same vertical planes as some of the other buttons 60. This is clearly shown in Fig. 4 wherein the portions or regions of plates 58 and 59 at which the openings 61 are formed are offset laterally in one direction and the peripheral edge portions are offset laterally in an opposite direction from the main body portions of the heat transfer plates. Since these off-set portions are the regions where the plates 58 and 59 are secured together and these regions are in alignment with the outer surfaces of the buttons 60 which butt against each other, an exceptionally rigid and strong structure is provided even though the heat transfer plates 58 and 59 are stamped from sheet metal stock, such as, for example, sheet steel having a thickness of about .025 inch.

All of the heat transfer plates 59 are the same with the extreme left-hand plate 59 in Figs. 3 and 4 having its flanges 62 flattened and unconnected to a heat transfer plate 58. The outlet 56 is formed by a cup-shaped member 65 having a flange secured by welding about the bottom opening in the left-hand heat transfer plate 59, as indicated at 66 in Fig. 4. Similarly, the inlet 55 is formed by a cup-shaped member 67 having a flange secured by welding about the top opening in the left-hand heat transfer plate 59, as indicated at 68 in Fig. 3. The openings in the side wall 64 through which the cup-shaped members 65 and 67 pass are flared outward and secured by welding to the cup-shaped members, as indicated at 69 in Figs. 3 and 4. The conduit 40 is connected to cup-shaped member 67, and the conduit 41 is connected to cup-shaped member 65.

The extreme right-hand heat transfer plate 58 in Figs. 3 and 4 differs from the other plates 58 in that this plate is imperforate and not provided with openings at the top and bottom. Since the upper parts of the passages 57 are in open communication with each other through the openings 61, it will be seen that a top header or cylindrical-shaped chamber 70 is provided having a more or less corrugated or zig-zag-shaped wall. The chamber 70 may be considered an extension of the cup-shaped member 67 and serves as a manifold from which absorption liquid divides into a plurality of small streams for flow through the narrow passages 57. As shown in Fig. 4, the streams of absorption liquid flowing downward in passages 57 come together in a bottom header or chamber 71 similar to the top chamber 70. From chamber 71 absorption liquid flows into cup-shaped member 65 and then leaves the liquid heat exchanger 35 through conduit 41.

Absorption liquid from absorber 14 flows through conduit 34 into bottom part of liquid heat exchanger 35 through inlet 52. The liquid divides into a plurality of small streams which flow about the portions of heat transfer plates 58 and 59 forming the bottom chamber 71. The liquid flows upwardly through the narrow passages 54 and about the portions of plates 58 and 59 forming the top chamber 70. The liquid from passages 54 leaves the liquid heat exchanger at the outlet 53 to which is connected the conduit 36.

In the refrigeration system illustrated in Fig. 1 and described above, the system may be charged with a water solution of lithium chloride to the level $p$ after first being evacuated. When the system is charged at the vessel 37, the solution will stand to the level $p$ in riser tubes 16 and conduit 34 and completely fill all of the passages in liquid heat exchanger 35. When steam is supplied to generator 10 and liquid is raised by vapor-lift action in riser tubes 16, circulation of absorption liquid takes place through and between absorber 14 and generator 10, in the manner explained above.

Since flow of absorption liquid is effected by gravity the available force to cause circulation of absorption liquid is relatively small. Hence, when liquid flowing from absorber 14 through conduit 34 enters the lower part of liquid heat exchanger 35 at inlet 52, the rate of flow of liquid slows up considerably due to the relatively large path of flow provided for liquid in the heat exchanger. Likewise, when absorption liquid spills into the upper part of conduit 40 from vessel 18 and flows through the conduit into inlet 55 of the liquid heat exchanger, the rate of flow of absorption liquid on its way to the absorber 14 also slows up considerably due to the relatively large path of flow provided for the liquid. In other words, the cross-sectional areas of the two paths of flow for liquid in liquid heat exchanger 35 are considerably greater than the cross-sectional areas of the conduits 34 and 40 and other interconnecting conduits. Also, with the system containing a salt solution like a water solution of lithium chloride, the absorption solution is relatively viscous and in a range from ten to twenty times greater than that of water. Since the circulating force for the absorption liquid is relatively small and the path of flow of the relatively viscous absorption liquid in the liquid heat exchanger is considerably greater than that provided by the interconnecting conduits, the liquid entering the heat exchanger becomes more or less stagnant in a manner comparable to that of water flowing into a large body of water from a stream or river. Even with the relatively slow liquid movement in the heat exchanger, good heat transfer is effected between relatively warm absorption liquid entering at inlet 55 and flowing downward in passages 57 and relatively cool liquid entering at inlet 52 and flowing upward through passages 54.

The relatively narrow body of absorption liquid flowing downward in each passage 57 is out of physical contact and in good thermal contact with the relatively narrow bodies of absorption liquid flowing upward in passages 54 adjacent thereto. By dividing the absorption liquid entering the inlets 52 and 55 into a plurality of small narrow streams which are in the neighborhood of about one-eighth inch in width, for example, the maximum heat transfer path is only one-half this distance or one-sixteenth inch. In this way heat is effectively conserved so that the absorption liquid flowing from liquid heat exchanger 35 through conduit 36 is at the highest possible temperature and absorption liquid flowing from the heat exchanger through conduit 41 to absorber 14 is cooled to the greatest possible extent.

In a liquid heat exchanger in which parallel passages are provided there is a likelihood of the liquid having a preference for flowing through certain pasages, and this is particularly true when the circulating force of the absorption liquid is small. In the present embodiment, the warm concentrated absorption liquid enters the heat exchanger at the top at inlet 55, and warm diluted absorption liquid also flows from the top of the heat exchanger at outlet 53. Since warm liquid is always above cooler liquid, equalization of liquid flow in the heat exchanger passages is always effected. For example, if warm concentrated absorption liquid tends to pick certain down-flow passages 57, the average specific gravity of liquid in such down-flow passages decreases. Since all of the down-flow passages 57 are in communication with each other at the bottom part of the liquid heat exchanger, there is a tendency for the cooler lateral columns of absorption liquid to react against the lower parts of the down-flow passages in which the average specific gravity of liquid is less, thereby retarding the preponderating flow in certain of the down-flow passages.

Both in the up-flow passages 54 and down-flow passages 57 there is natural stratification of absorption liquid with a change in density thereof between the warm upper parts and cooler lower parts of the passages. The density of the absorption liquid increases toward the cooler lower parts of the passages, the density at any particular region being dependent upon the temperature existing at that region. The natural stratification of absorption liquid in the liquid heat exchanger is highly desirable because this promotes uniform flow of liquid in the parallel passages with the heat exchange in the individual passages controlling the upward and downward movement of liquid in passages 54 and 57, respectively. Natural stratification of liquid is readily effected in liquid heat exchanger 35 because the absorption liquid is relatively viscous and becomes more or less stagnant while passing through the passages 54 and 57. With uniform flow and subdivision of absorption liquid in the passages 54 and 57, all parts of the liquid heat exchanger are properly employed to effect heat transfer with no parts thereof being overloaded or subjected to an uneven distribution of the heat transfer load.

The rate of flow of absorption liquid should always be within a maximum upper limit, so that natural stratification of absorption liquid is insured. The flow of absorption liquid should not become so great as to upset the stratification effect that causes and promotes equal division of liquid flow in the liquid heat exchanger passages. As long as the rate of flow of absorption liquid is such that natural stratification of liquid is effected in the passages 54 and 57, the pressure drop in the passages due to flow of liquid therethrough is always less than the internal forces which maintain the stratification.

In order to illustrate the liquid heat exchange structure more clearly, the passages 54 and 57 in Fig. 4 have been illustrated as being considerably wider than in structures which have been built and from which the drawings were made. In a refrigeration system having an ice melting capacity of five tons, the liquid heat exchanger connected in the system and like that described above and illustrated in the drawings is approximately twenty inches high, ten and one-quarter inches wide, and four and five-sixteenths inches deep. It will be clear that a liquid heat exchanger has been provided which, besides being extremely efficient, is also relatively small and occupies a minimum amount of space. In the liquid heat exchangers actually built and having the dimensions just mentioned, the passages 54 and 57 are approximately one-eighth inch wide in their narrow dimension and approximately ten and one-quarter inches in over-all length. While the passages in their narrow dimension may be as high as three-sixteenths inch it is preferable to maintain the narrow dimension in the order of one-eighth inch in order to keep the maximum heat transfer path at a minimum of one-sixteenth inch, which is one-half the narrow dimension. The longer dimension of the passages should preferably be at least twenty times the narrow dimension in order to provide ample space in the passages, so that complete bridging of the passages with salt crystals is avoided when the system is shut down. Even though some precipitation of salt may occur in the passages of the liquid heat exchanger when the refrigeration system is shut down, the likelihood of the passages being completely blocked off is extremely remote, so that circulation of absorption liquid will always take place when the refrigeration system is again started. Besides assuring that circulation of absorption liquid always will be effected, the circulation of liquid tends to dissolve any salt crystals which have precipitated in the passages of the liquid heat exchanger.

While a single embodiment of the invention has been shown and described, it will be apparent that modification and changes may be made without departing from the spirit and scope of the invention, as pointed out in the following claims.

What is claimed is:

1. In an absorption refrigeration system including a generator and an absorber and in which liquid is raised by vapor-lift action in the generator and the raised liquid flows to the absorber and from the latter to the generator by gravity, a liquid heat exchanger having multiple vertically extending passages for absorption liquid flowing from the generator to the absorber and additional multiple vertically extending passages for absorption liquid flowing from the absorber to the generator, said heat exchanger being so constructed and arranged and interrelated with respect to the rate of flow of liquid effected by gravity that heat exchange in the individual passages controls and promotes movement of relatively stagnant liquid upward and downward in the adjacent individual passages.

2. In the art of refrigeration in which a water solution of a salt is employed as the absorption liquid and water is employed as the refrigerant, such salt solution having a viscosity relatively high compared to that of water, and the absorption liquid circulates between a place of vapor expulsion and a place of absorption, the improvement which consists in flowing warm concentrated absorption liquid from the place of vapor expulsion downwardly through a plurality of passages and flowing cool diluted absorption liquid from the place of absorption upwardly through a plurality of passages in thermal exchange relation with the passages through which warm concentrated liquid flows, and limiting the maximum rate of flow of concentrated and diluted absorption liquid so that natural stratification of liquid in the passages is always effected to promote uniform flow of liquid in the passages.

3. In an absorption refrigeration system including a vapor expeller and an absorber and in which liquid is raised by vapor-lift action in the expeller and the raised liquid flows to the absorber and from the latter to the expeller by gravity, such liquid having a viscosity relatively high compared to that of water, a liquid heat exchanger having a plurality of vertically extending passages for absorption liquid flowing from the expeller to the absorber and a plurality of other vertically extending passages for absorption liquid flowing from the absorber to the expeller, said liquid heat exchanger being so constructed and arranged and so interrelated to said expeller that the maximum rate of flow of absorption liquid by gravity is such that flow of liquid is effected in said passages without upsetting the natural stratification effect of the liquid produced in said passages.

4. In an absorption refrigeration system including a generator and an absorber and in which liquid is raised by vapor-lift action in the generator and the raised liquid flows to the absorber and from the latter to the generator by gravity, such liquid having a viscosity relatively high compared to that of water, a liquid heat exchanger having a first path for absorption liquid flowing from the generator to the absorber and a second path for absorption liquid flowing from the absorber to the generator, said liquid heat exchanger including a plurality of heat transfer plates disposed alongside each other and being so constructed and arranged that a plurality of vertically extending passages are formed between the plates with alternate passages serving to divide liquid into a plurality of streams in the first path and the other passages serving to divide the absorption liquid into a plurality of streams in the second path, the vertically extending passages in the first path being in open communication with each other at their lower parts, whereby equalization of flow of liquid into the said alternate passages is effected, and said liquid heat exchanger being so constructed and arranged and interrelated in such a manner to the rate of flow of liquid effected by gravity that flow of liquid is effected in said passages without upsetting the natural stratification of the liquid produced in said passages.

5. In an absorption refrigeration system including an absorption liquid circuit containing liquid having a viscosity relatively high compared to that of water and comprising a generator having a riser tube and an absorber and in which liquid is raised by vapor-lift action in the generator and the raised liquid flows to the absorber and from the latter to the generator by gravity, such vapor-lift action being characterized by the liquid being carried up as an annulus along the inside wall of the tube by the more rapidly flowing vapor in the center of the annulus, a liquid heat exchanger having a first path for absorption liquid flowing from the generator to the absorber and a second path for absorption liquid flowing from the absorber to the generator, said liquid heat exchanger including a plurality of heat transfer plates disposed alongside each other and being so constructed and arranged that a plurality of vertically extending passages are formed with alternate passages serving to divide the liquid into a plurality of streams in the first path and other passages serving to divide the liquid into a plurality of streams in the second path, said liquid heat exchanger being connected in the liquid circuit in such a manner that in the first path the streams of liquid flow downward in the alternate passages and in the second path the streams of liquid flow upward in the other passages, and the heat exchanger passages being so proportioned and interrelated to the rate of flow of liquid effected by gravity that heat exchange between liquid in said passages controls and promotes movement of relatively stagnant liquid in the first and second paths.

6. In an absorption refrigeration system including a generator and an absorber and means including a liquid heat exchanger interconnecting the generator and absorber to form a circuit for circulation of absorption liquid having a viscosity relatively high compared to that of water, said liquid heat exchanger including a plurality of heat transfer plates disposed alongside each other and being so constructed and arranged that a plurality of closely adjacent vertically extending passages are formed between the plates, said liquid heat exchanger having openings adjacent opposite ends thereof and being connected in the absorption liquid circuit in such a manner that absorption liquid flowing from the generator to the absorber passes downwardly through alternate passages and absorption liquid flowing from the absorber to the generator passes upwardly through the other passages, and the depth of the passages being three-sixteenths inch or less and the distance between opposite vertical edges of the passages for a major portion of their length being at least twenty times the depth, said passages being so proportioned with respect to the rate at which absorption liquid is circulated in said circuit that flow of liquid is effected in the passages without upsetting the natural stratification effect produced by the liquid in the passages.

7. In the art of refrigeration in which absorption liquid is raised by vapor-lift action in a place of vapor expulsion and the raised liquid flows to a place of absorption and then back to the place of vapor expulsion by gravity, the improvement which consists in spreading out in a first region liquid flowing from the place of vapor expulsion to the place of absorption and also spreading out in a second region liquid flowing from the place of absorption to the place of vapor expulsion, whereby the gravity flow of liquid is decreased in said regions so that flow of liquid therethrough is more or less stagnant, flowing the liquid in said first region in heat transfer relation with the liquid in said second region, and limiting the maximum flow of liquid in said regions so that natural stratification of liquid is effected in said regions to promote uniform flow of liquid therethrough.

8. In an absorption refrigeration system including a generator and an absorber and in which liquid is raised by vapor-lift action with the raised liquid flowing to the absorber and from the latter to the generator by gravity, a liquid heat exchanger having a first path for absorption liquid flowing from the generator to the absorber and a second path for liquid flowing from the absorber to the generator, said liquid heat exchanger being so constructed and arranged that a plurality of relatively narrow passages are formed with alternate passages serving to divide the liquid into a plurality of streams in the first path and other passages serving to divide the liquid into a plurality of streams in the second path, and the passages being three-sixteenths inch or less in depth and the distance between opposite edges of the passages for a major portion of their length being at least twenty times the depth, the passages being so proportioned with respect to the rate at which absorption liquid flows by gravity that flow of liquid is effected in the passages without upsetting the natural stratification effect produced by the liquid in the passages.

9. In an absorption refrigeration system including a generator and an absorber and means including a liquid heat exchanger interconnecting the generator and absorber to form a circuit for circulation of absorption liquid, said liquid heat exchanger including a plurality of heat transfer plates disposed alongside each other and being so constructed and arranged that a plurality of relatively narrow passages are formed with alternate passages serving to divide into a plurality of streams liquid flowing from the generator to the absorber and other passages serving to divide into a plurality of streams liquid flowing from the absorber to the generator, and the effective cross-sectional area of the alternate passages and also of the other passages being so related to the rate of flow of liquid in the absorption liquid circuit during operation of the refrigeration system that the liquid is more or less stagnant during movement thereof through the passages in said liquid heat exchanger with the heat exchange between the individual passages controlling and promoting movement of liquid in the passages.

10. In an absorption refrigeration system having a circuit including a generator and an absorber and structure in said circuit to cause circulation of absorption liquid therein, such absorption liquid having a relatively high viscosity compared to that of water, a liquid heat exchanger having multiple vertically extending passages for liquid flowing in said circuit from the generator to the absorber and additional multiple vertically extending passages for liquid flowing in said circuit from the absorber to the generator, said heat exchanger being so constructed and arranged and interrelated in such a manner to said structure causing circulation of liquid in said circuit that stratification of liquid in said passages is always effected with the heat exchange in the individual passages controlling and promoting movement of liquid in the liquid heat exchanger.

11. In an absorption refrigeration system having a circuit including a generator and an absorber and in which liquid is raised by vapor-lift action with the raised liquid flowing in said circuit by gravity action, a liquid heat exchanger having multiple vertically extending passages for liquid flowing in said circuit from the generator to the absorber and additional multiple vertically extending passages for liquid flowing in said circuit from the absorber to the generator, said heat exchanger being so constructed and arranged and interrelated in such a manner to the rate of flow of liquid by gravity action that the pressure drop due to flow of liquid in the passages is less than the internal forces maintaining stratification of the liquid, whereby substantially equal flow of liquid in the passages is effected.

ALBERT R. THOMAS.